United States Patent [19]

Milner

[11] Patent Number: 4,914,638

[45] Date of Patent: Apr. 3, 1990

[54] DOPPLER EFFECT SPEEDOMETER

[75] Inventor: Ronald E. Milner, Grass Valley, Calif.

[73] Assignee: Applied Design Laboratories, Inc., Grass Valley, Calif.

[21] Appl. No.: 584,432

[22] Filed: Feb. 28, 1984

[51] Int. Cl.$^4$ ............................................. G01S 15/60
[52] U.S. Cl. ........................................ 367/90; 367/91
[58] Field of Search ..................... 367/89–91, 367/98, 902, 904; 343/7 PL, 8, 418; 128/687–690, 668, 669; 364/561; 455/260; 328/155; 342/103

[56] References Cited

U.S. PATENT DOCUMENTS

| | | | |
|---|---|---|---|
| 3,719,923 | 3/1973 | Waterman | 367/91 |
| 4,135,188 | 1/1979 | Bickley, Jr. | 343/8 |
| 4,231,039 | 10/1980 | Fritzlen et al. | 343/8 |
| 4,324,135 | 4/1982 | Peyton | 367/89 |
| 4,371,945 | 2/1983 | Karr et al. | 364/561 |
| 4,566,461 | 1/1986 | Lubell et al. | 128/689 |
| 4,581,726 | 4/1986 | Makino et al. | 367/902 |

FOREIGN PATENT DOCUMENTS 8301120  3/1983  PCT Int'l Appl. .................... 343/8

OTHER PUBLICATIONS

Wait et al, Introduction to Operational Amplifier Theory and Applications, May 1975, pp. 170–171.

Primary Examiner—Thomas H. Tarcza
Assistant Examiner—Daniel T. Pihulic
Attorney, Agent, or Firm—Michael L. Sherrard; Kenneth E. Leeds

[57] ABSTRACT

A speedometer is provided for determining speed by providing a sound signal at a first frequency, receiving a second signal which is the reflection of the first signal, and determining difference in frequency between the first and second signals created by the Doppler Effect. A speech synthesis chip within the speedometer provides a verbal indication of velocity. In this way, a person using the provided speedometer does not have to look at a dial or other visual indicator.

Provided within the speedometer is a heat-sensitive transducer for measuring the air temperature. In this way, the speedometer can take into account the change in the speed of sound with respect to temperature when calculating velocity.

9 Claims, 10 Drawing Sheets

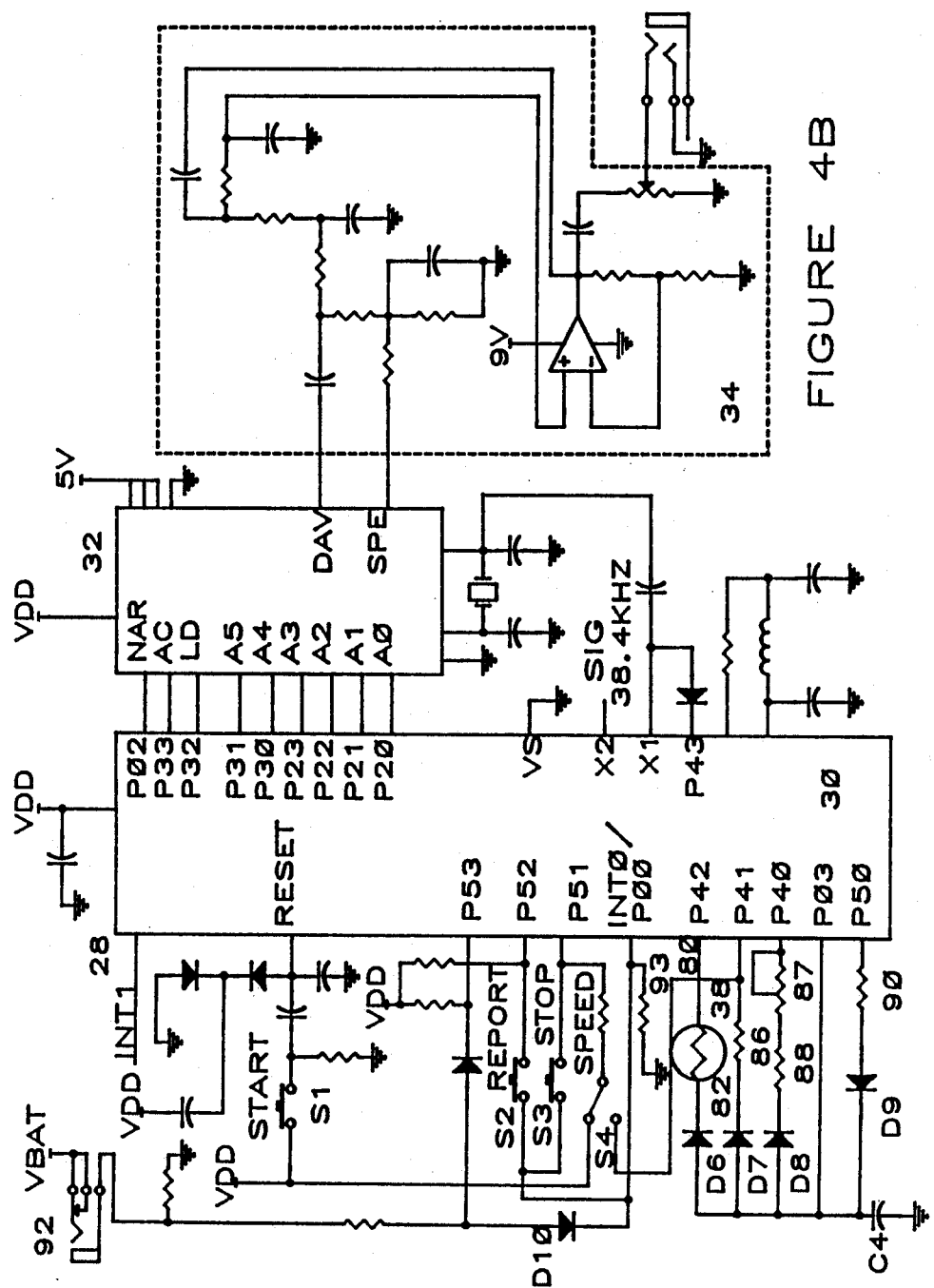

4,914,638

DOPPLER EFFECT SPEEDOMETER

BACKGROUND OF THE INVENTION

This invention relates to speedometers, and more particularly, to speedometers which utilize the Doppler Effect.

The Doppler Effect is a well known phenomenon. It occurs when a traveling object emits sound. When that happens, a stationary listener perceives the sound as being at a higher or lower pitch, depending upon whether the object is traveling towards or away from the listener. The Doppler Effect also occurs when the listener is moving and the source of the sound is stationary. In that situation, the pitch perceived by the listener depends upon the velocity of the listener relative to the sound source. The variation in pitch is governed by well known equations.

It is known in the art to use the Doppler Effect to measure speed. For example. U.S. Pat. No. 3,094,693, entitled "Velocity Sensing Apparatus." issued to D. G. Taylor, uses the Doppler Effect to measure the speed of a tractor. U.S. Pat. No. 4,065,745, entitled "Doppler Speedometer," issued to K. H. Robinson discloses the use of the Doppler Effect to measure the speed of a boat. Both these references disclose apparatus for providing a sound signal which strikes a surface, such as the ground, which reflects the sound back towards the apparatus. The apparatus receives the sound signal, and measures speed based on changes in the frequency spectrum of the reflected signal.

SUMMARY OF THE INVENTION

A Doppler Effect speedometer is provided including a transducer for transmitting a sonic signal at a first frequency. A receiver receives the sonic signal after it has been reflected by an object, such as the ground, and a pre-amplifier amplifies the received signal. The output of the pre-amplifier is presented to a field effect transistor, which multiplies the signal times a square wave having a frequency equal to the frequency provided by the transducer. The signal is then passed through a band-pass filter for eliminating high-frequency signal components. The output of the band-pass filter is then presented to a hysteresis circuit which provides a digital output having a frequency indicative of the the Doppler shift of the reflected sound. The digital output is presented to a phase-locked loop, which provides a second digital output having a frequency indicative of the Doppler shift of the reflected sound. The state of the second digital output is monitored by a microprocessor which calculates a speed based on that frequency.

A speech synthesis circuit is provided for generating an audio output. In this way, a person using the provided speedometer does not have to look at a dial or indicator. Rather, the speech synthesis circuit tells the user how fast he or she is traveling.

Also provided is a second transducer for determining the air temperature. This is necessary because the amount of frequency shift of the sound signal is dependent on the velocity of sound, which in turn varies with air temperature. Therefore, a more accurate measuring device is provided.

BRIEF DESCRIPTION OF THE DRAWINGS

FIGS. 4a and 4b are detailed schematic diagrams of the Doppler Effect speedometer.

DETAILED DESCRIPTION OF THE PREFERRED EMBODIMENT

Figure 1:
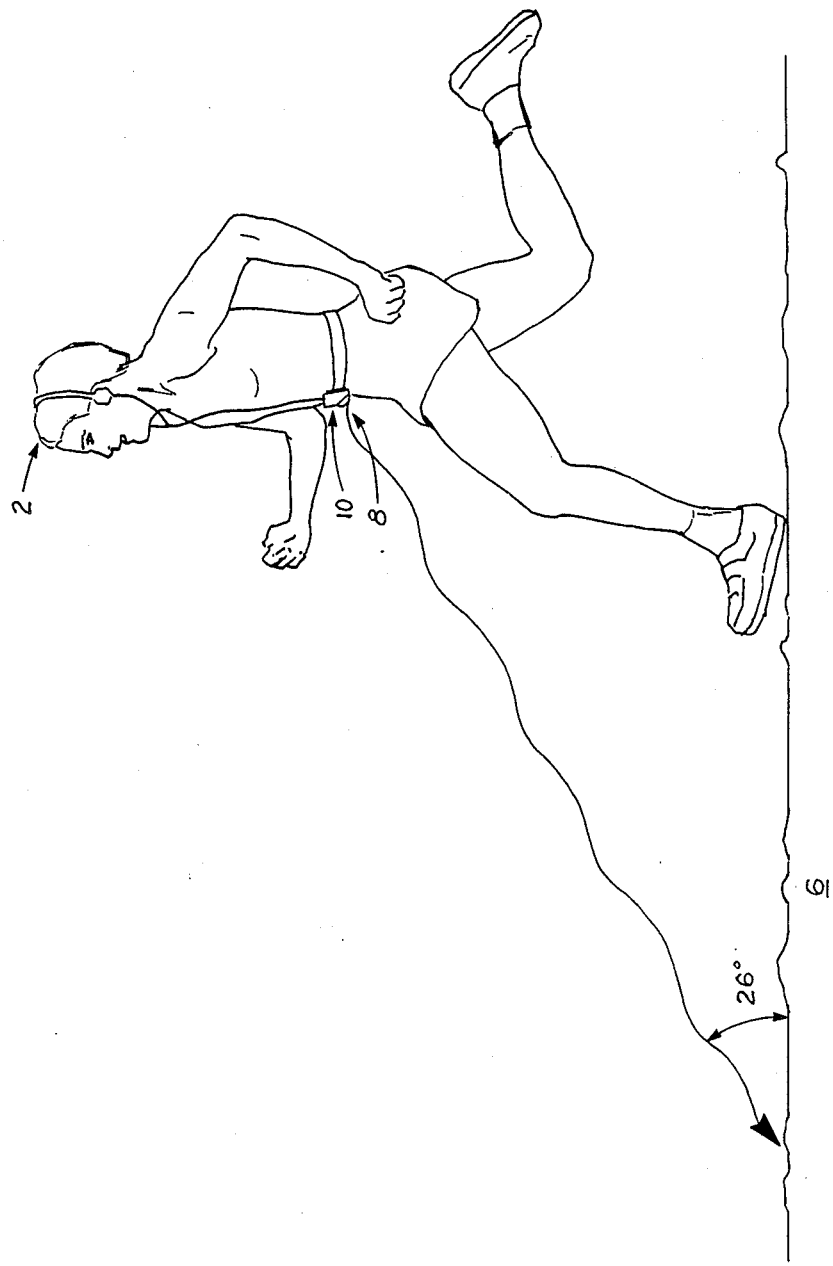
FIG. 1 is an illustration of a jogger using a Doppler Effect speedometer in accordance with the preferred embodiment of the invention.

Referring to FIG. 1, a Doppler Effect speedometer 10 in accordance with the preferred embodiment of the invention is worn by a jogger 2. Speedometer 10 emits a sound wave 4 at an angle of about 26° below horizontal which strikes an object, such as the ground 6, and is reflected back to speedometer 10. A receiver 8 within speedometer 10 receives the sound wave, permitting speedometer 10 to determine the speed that jogger 2 is traveling at in response to the received signal. Under these conditions, the frequency of the received signal is approximately as follows:

$$f = f_o \times (1 + 2V_o/V) \times Cos(26°)$$

where f is the frequency of the signal received by receiver 8, $f_o$ is the frequency of the signal generated by speedometer 10, Vo is the speed that speedometer 10 is traveling at, V is the speed of sound, and 26° is the angle from the horizontal at which sound wave 4 strikes the ground. An audio speech output signal is provided as will be described below so that a person using bicycle 2 does not have to divert his attention in order to read a dial.

Figure 2:
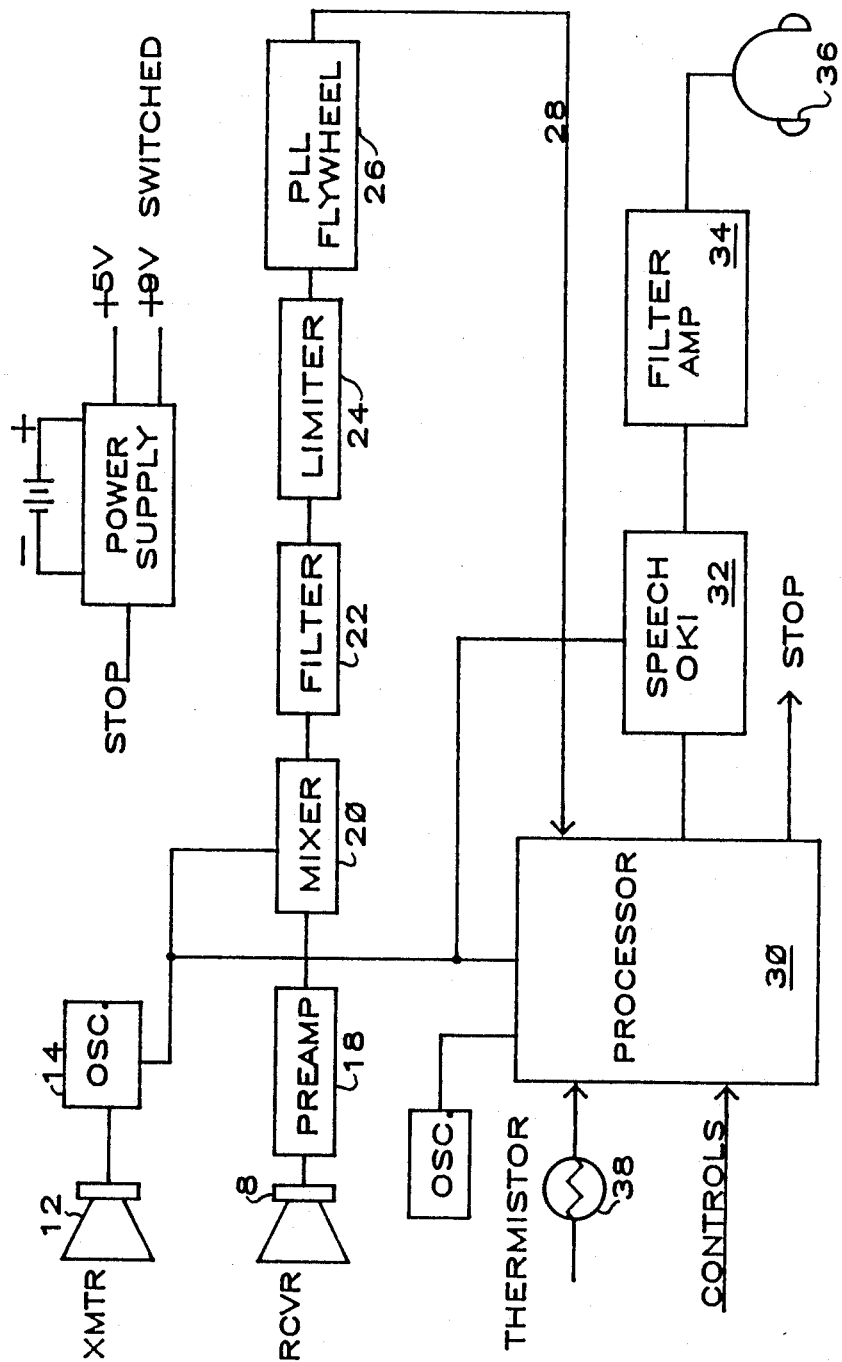
FIG. 2a is a block diagram of the Doppler Effect speedometer illustrated in FIG. 1.
FIG. 2b is an illustration of a horn used to direct sound waves from a transmitter used in the speedometer of FIG. 1.
Figure 2A:
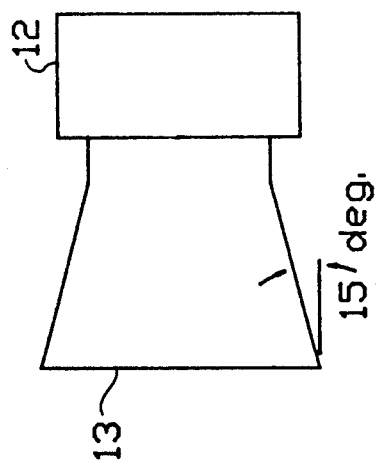

Referring to FIG. 2a, Speedometer 10 includes a sound transmitter 12 coupled to an oscillator 14. In the preferred embodiment, transmitter 12 is of a variety such as model number EFR-RSB40K2, available from Panasonic, Inc., and is coupled to a horn 13 illustrated in FIG. 2b. Oscillator 14 is designed to oscillate at 38.4 KHz. The transmitter 12 emits sound waves at a first frequency generated by oscillator 14. The sound waves eventually strike object 6 and are reflected back towards a receiver 8. Receiver 8 is of a variety such as model number EFR-OSB40K2, also available from Panasonic, Inc.. The signal received by receiver 8, having a second frequency, is amplified by a pre-amplifier 18. Pre-amplifier 18 typically has a gain of approximately 500.

The output of pre-amplifier 18 is presented to a mixer 20. Mixer 20 multiplies the signal received by receiver 8 with a square wave provided by oscillator 14. This provides a signal having frequency components equal to the sum and difference of the first frequency (i.e. the frequency provided by oscillator 14) and the second frequency (i.e. the frequency of the signal received by receiver 8).

For example, if the first frequency was 38.4 KHz, and the second frequency was 39.4 KHz, the signal generated by mixer 20 would have a sum frequency component equal to 38.4+39.4 KHz, or 77.8 KHz, as well as a difference frequency component, equal to 39.4–38.4 KHz, or 1 KHz.

Since the square wave being multiplied with the output of pre-amplifier 18 has frequency components equal to the harmonics of the first frequency, the output signal of mixer 20 also contains frequency components equal to the sums and differences of the second frequency and the harmonics of the first frequency.

Figure 3:
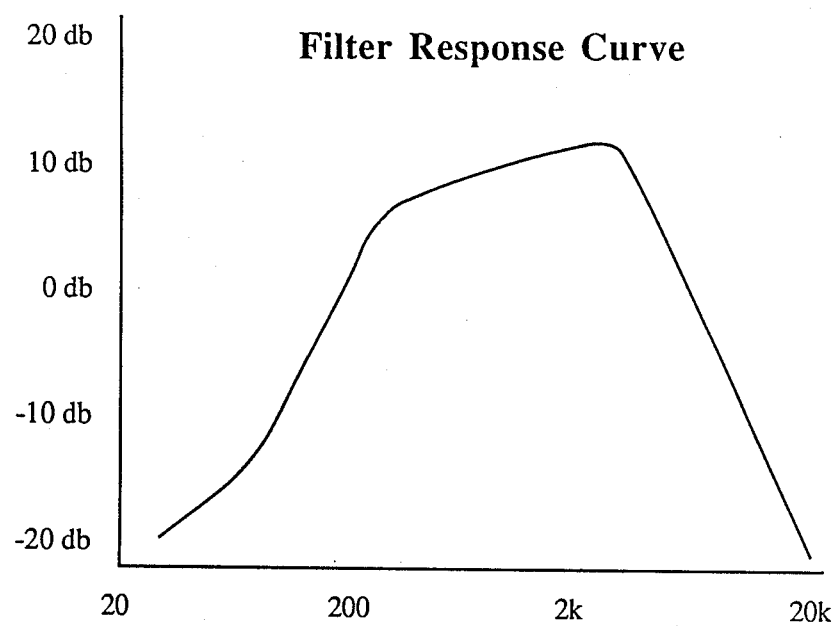
FIG. 3 is a graph of the gain versus frequency of a band pass filter used in the block diagram of FIG. 2.

The signal generated by mixer 20 is then presented to the input of a bandpass filter 22, which permits the frequency component having a frequency equal to the difference between the first and second frequencies to pass, but filters out the sum frequency component as well as the sum and difference components between the harmonics of the first frequency and the second frequency. A graph of gain versus frequency of bandpass filter 22 is provided in FIG. 3.

The output of bandpass filter 22 is coupled to a limiter/threshold detector 24. Limiter/threshold detector 24 "cleans up" the signal presented by bandpass filter 22 in a manner described more completely below. Limiter/threshold detector 24 provides a square wave signal having a frequency indicative of velocity. The output of limiter/threshold detector 24 is presented to a phase-locked loop circuit 26. The applicant has found that for various reasons, occasionally the signal received by receiver 8 is of insufficient amplitude to overcome the hysteresis of limiter/threshold detector 24. This happens for a variety of reasons. However, phase-locked loop circuit 26 includes a capacitor (illustrated in FIG. 4 and described in more detail below) which stores a charge indicative of the frequency of the output of limiter/threshold detector 24. This capacitor, which is coupled to a voltage-controlled oscillator within phase-locked loop circuit 26, discharges slowly. Therefore, a brief disappearance of the signal received by receiver 8 will not disturb the number of pulses generated by phase-locked loop circuit 26. Thus, phase-locked loop circuit 26 functions as a "flywheel" to maintain the pulse train indicative of the Doppler frequency.

An output 28 of phase-locked loop circuit 26 is presented to a microprocessor 30, which monitors the state of that output. Microprocessor 30 is of a variety such as model number 7507S, available from NEC. Microprocessor 30 is adapted to execute the instructions contained in the software of appendix A, which are stored in an on-chip 2 K×8 ROM located within microprocessor 30. Microprocessor 30 calculates the speed of the speedometer by counting the number of periods of the signal generated by phase-locked loop circuit 26 during a given time. Microprocessor 30 then causes a speech synthesis circuit 32 to generate audio signals via an audio filter 34, which is coupled to a transducer such as a conventional audio headset 36. Speech synthesis circuit 32 is a device such as model number MSM6202. available from Oki Semiconductor, Inc.. Filter 34 has a 3 KHz center frequency, and is provided to reduce switching noise.

Also coupled to microprocessor 30 is a thermistor 38. Thermistor 38 has a resistance which varies in response to its temperature. This resistance is measured by microprocessor 30 to determine the air temperature, which is used in the speed calculations. This is because the velocity of sound and the shift in frequency caused by the Doppler Effect varies with air temperature. The temperature measurement is executed every two seconds to maintain high accuracy. Microprocessor 30 alters the time period during which it counts the cycles of the phase-locked loop circuit 26 in response to the calculated temperature. In this way, microprocessor 30 uses the temperature information in the speed calculation to produce more accurate results.

Also coupled to microprocessor 30 are a set of controls which cause microprocessor 30 to execute a variety of functions. These include a start button, a stop/restart button, a report button which causes speedometer 10 to state the distance, time, and average speed, a speed/pace switch which causes speedometer 10 to state speed in terms of miles per hour or minutes per mile, a rate control potentiometer which governs how often speedometer 10 states the speed, and a volume control which governs how loudly speedometer 10 states the speed.

Figure 4A:
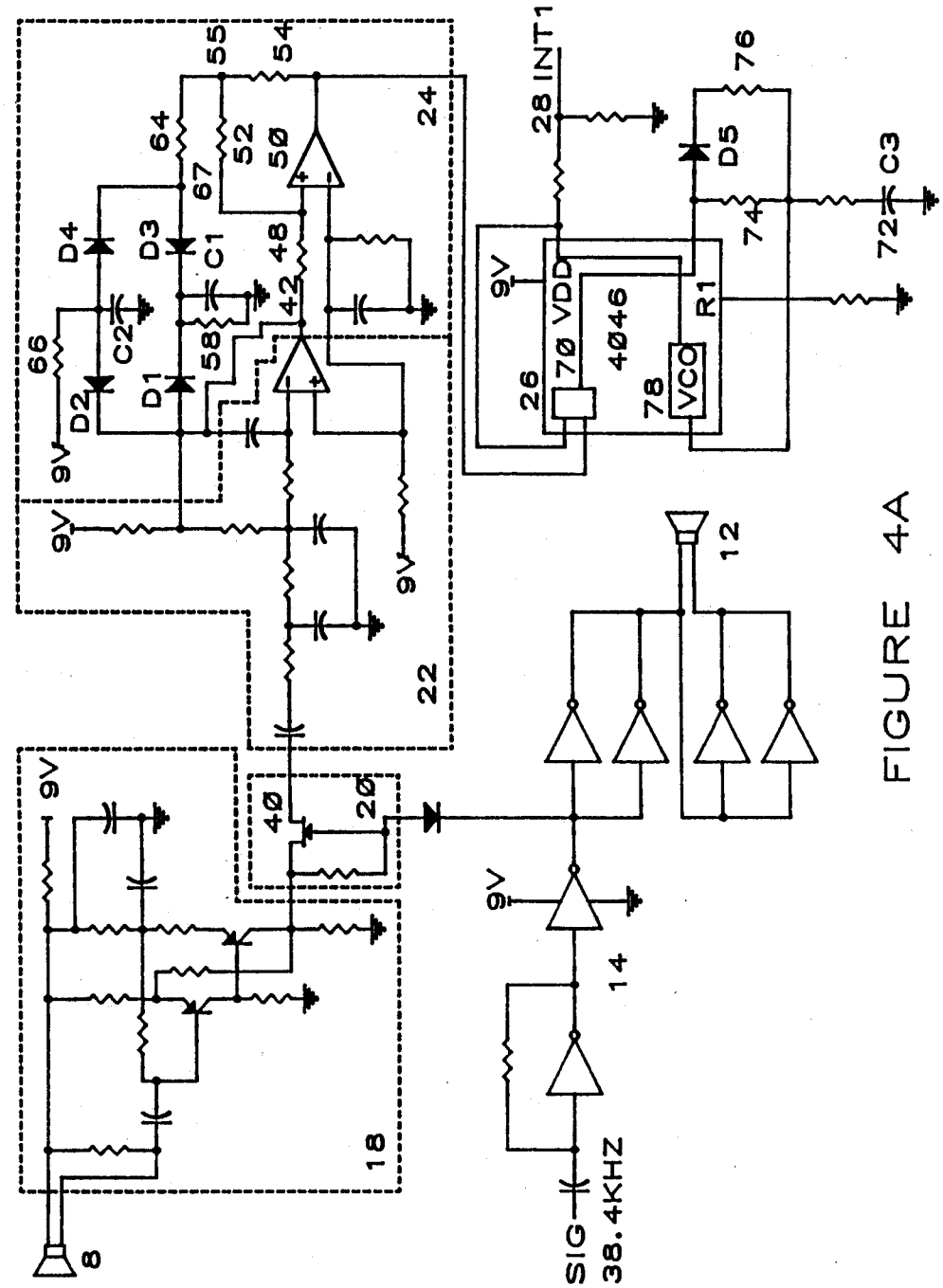

Referring to FIG. 4, a detailed schematic diagram of speedometer 10 is provided. As seen in FIG. 4, mixer 20 is field effect transistor 40 which is coupled to oscillator 14. In the preferred embodiment, transistor 40 is model number J201 available from National Semiconductor, Inc..

As described above, mixer 20 is coupled to filter 22, the output of which is digitized by limiter/threshold detector 24, which includes an input node 42 coupled to the anode of a diode D1, the cathode of a diode D2, and a resistor 48. Resistor 48 is coupled to the non-inverting input of an operational amplifier 50 and a resistor 52. The output of operational amplifier 50 is coupled to a resistor 54 and phase-locked loop circuit 26. Resistor 54 is coupled to a node 55 which is connected to resistor 52 and a resistor 64.

The cathode of diode D1 is resistively coupled to ground via a resistor 58. The cathode of diode D1 is also coupled to the cathode of a diode D3 and a capacitor C1. The anode of diode D3 is resistively coupled to node 55 via resistor 64.

The anode of diode D2 is coupled the the anode of a diode D4 and capacitor C2. In addition, the anode of diode D2 is resistively coupled to a 9 volt power supply via a resistor 66. The cathode of diode D4 is coupled to the anode of diode D3 and resistor 64 at a node 67.

The inverting input of operational amplifier 50 is coupled to a power source providing a relatively constant voltage of about 3.5 volts. During operation, the output of operational amplifier 50 is either in a high state or a low state, and drives phase-locked loop circuit 26

Operation of Limiter/threshold Detector 24

Figure 5:
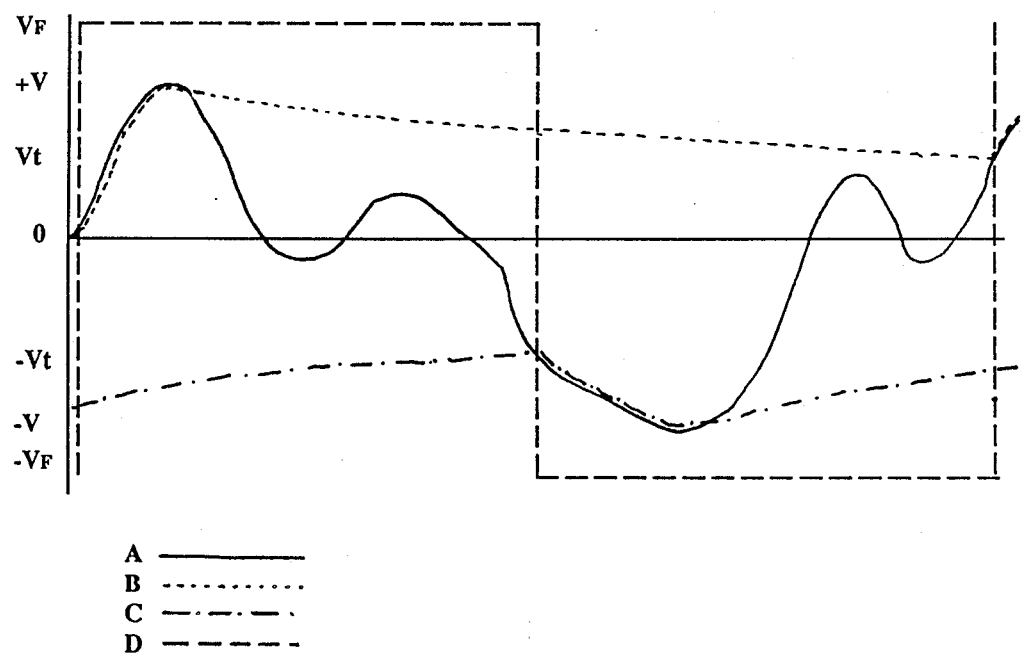
FIG. 5 is an illustration of a set of waveforms of signals present at various nodes within the circuit of FIG. 4.

As mentioned above, limiter/threshold detector 24 is provided to "clean up" the output of filter 22. It has been found that the processing of the output of filter 22 provided by limiter/threshold detector 24 causes speedometer 10 to provide much more accurate readings. The operation of limiter/threshold detector 24 can best be understood in reference to the waveforms illustrated in FIG. 5.

Waveform A is an illustration of a typical waveform provided by filter 22. It is readily apparent that waveform A is not a pure sine wave, part of the reason for that is that the reflected sonic signal received by receiver 8 is not a pure sine wave having a single frequency but rather a spectrum of frequencies surrounding a principal frequency. Waveform A is confined between a value of $+V$ and $-V$. While the output of filter 22 is at a positive voltage, diode D1 conducts, and charges capacitor C1 to a voltage $+V-Vd$, where Vd equals the voltage drop across a diode when it is conducting. Waveform B illustrates the voltage across capacitor C1. When the output of filter 22 drops, diode D1 becomes non-conducting. When the output of filter 22 becomes negative, diode D2 starts to conduct, and capacitor C2 starts charging, and eventually reaches the value $Vd-V$. Waveform C illustrates the voltage across capacitor C2. When the output of filter 22 starts rising, diode D2 becomes non-conducting. Because of the presence of resistors 62 and 66, capacitors C1 and C2 slowly discharge until the output of filter 22 deposits more charge on them.

Waveform D illustrates the voltage present at the output of operational amplifier 50. When the output of filter 22 is at $+V$. the output of operational amplifier 50 is in its high state. Because of this, node 55 is pulled up to a voltage that is greater than the voltage present across capacitor C2. Therefore, diode D4 is non-conducting. The voltage present at node 55 permits diode D3 to conduct. Because diode D3 is conducting, the voltage present at node 67 equals the voltage stored across capacitor C1 plus the voltage drop across D3, or $$+V-Vd+Vd=+V.$$

As the output of filter 22 starts to drop, the state of operational amplifier 50 does not change immediately. Rather, the state of operational amplifier 50 changes state only after the output of filter 22 drops below a voltage Vt, determined by the ratio of the resistances of resistors 48 and 52. This is because the voltage present at node 55 is determined by the voltage present at node 67, which in turn is roughly equal to $+V$. Resistors 48 and 52 form a voltage divider network, so that the voltage present at the non-inverting input of operational amplifier 50 is approximately equal to the quantity $$Vf\times(R48/(R48+R52))+V55\times(R52/(R52+R48)).$$

where Vf is the voltage presented by filter 22; R48 is the resistance of resistor 48. R52 is the resistance of resistor 52, and V55 is the voltage present at node 55. In the preferred embodiment, R48 is 470 Kohm and R52 is 1 Mohm. Therefore, the output of operational amplifier will not change state until the output of filter 22 drops to about one half of the value $-V$. When that happens, operational amplifier 50 changes state and drops to a negative value, diode D3 becomes non-conducting, diode D4 starts conducting, and the output of operational amplifier 50 does not change state again until the voltage presented by filter 22 rises to a value of $+V/2$. Therefore, limiter/threshold detector 24 serves as a self adjusting hysteresis circuit and prevents spurious zero-crossings from affecting phase-locked loop circuit 26.

Phase-locked Loop Circuit 26

Referring again to FIG. 4, it is seen that the output of limiter/threshold detector 24 is presented to the input of a phase-frequency comparator 70 within phase-locked loop circuit 26. Phase-locked loop circuit 26 is of a variety such as model number 4046, available from Motorola, Inc.. The output of phase-frequency comparator 70 within phase-locked loop circuit 26 is coupled to a capacitor C3 through a resistor 74 and also through a diode D5 and a resistor 76. Capacitor C3 is coupled to a voltage-controlled oscillator (VCO) 78. The output of VCO 78 is connected to phase-frequency comparator 70. Therefore, when the output of phase-frequency comparator 70 is in a high state, capacitor 72 is charged through an effective resistance of a 180 Kohm resistor in parallel with a 1 Mohm resistor, but when the output of phase-frequency comparator 70 is low, capacitor C3 can only discharge through 1 Mohm resistor 74. Because of this, capacitor C3 discharges much more slowly than it charges. More specifically, capacitor C3 charges with an RC time constant of about 0.8 seconds, but discharges with an RC time constant of about 5 seconds. Therefore, if a transient disappearance of the signal present at the output of limiter/threshold detector 24 occurs, phase-locked loop circuit 26 acts as a "fly-wheel," and will maintain the frequency of its output so as not to distort the speed calculation being performed by microprocessor 30.

Temperature Calculation Circuit

The output 28 of phase-locked loop circuit 26 is coupled to microprocessor 30. Microprocessor 30 calculates the speed that speedometer 10 is moving at from the frequency of the signal. However, part of that calculation involves determining the ambient air temperature. Therefore, as described above, thermistor 38, which is of a variety such as model number RL-2006-130-14-D1 available from Keystone, Inc., is coupled to microprocessor 30 for this purpose. However, the microprocessor model selected does not have any analog-to-digital input ports. Therefore, the following apparatus for temperature calculation is employed.

Thermistor 38 has a first node 80 and a second node 82. First node 80 is coupled to an output P42 of microprocessor 30, while second node 82 is coupled to a capacitor C4 via a diode D6. Also provided is a calibration resistor 86, which is coupled an output P41 of microprocessor 30, and to capacitor C4 via a diode D7. Also provided is a potentiometer 87 which is coupled to an output P40 of microprocessor 30, and a resistor 88, which in turn is coupled to capacitor C4 via a diode D8. (Potentiometer 87 is the rate control potentiometer discussed above which permits the user to determine how often he wishes speedometer 10 to report the speed.) An input p03 of microprocessor 30 is coupled to capacitor C4. An output P50 of microprocessor 30 is coupled to a resistor 90, which in turn is coupled to a diode D9, which in turn is coupled to capacitor C4.

During operation, every two seconds, microprocessor 30 uses this apparatus to calculate the air temperature by first setting outputs P42, P41, P40, and P50 in the high state. This causes output P50 to charge up capacitor C4 through resistor 90. This is indicated as time T1 of FIG. 6. Because diodes D6, D7, and D8 are back-biased, they are non-conducting, and do not affect the voltage across capacitor C4. This continues until it is determined that input P03 is in the high state, i.e. is at a voltage greater than the VIH. threshold of input P03. This typically takes about 1 ms. After that happens, outputs P42, P41, P40, and P50 are all dropped to the low state, and capacitor C4 is permitted to discharge through resistor 86, potentiometer 87, and thermistor 38. This continues until the voltage present at input P03 passes the VIL threshold. This time period, indicated as time T2 of FIG. 6, also takes about 1 ms.

Next, outputs P42, P41. P40, and P50 are all put in the high state for a fixed time to charge capacitor C4 up to a reference voltage near Vdd (time T3 of FIG. 6). Typically, a time of about 5 ms is appropriate to charge up capacitor C4. After this happens, capacitor C4 is discharged through calibration resistor 86 until the voltage present at input P03 passes the VIL threshold. This is done by forcing outputs P42 and P40 to the high state. While forcing outputs P50 and P41 to the low state. The number of CPU cycles it takes to discharge capacitor C4 is counted and stored (time T4 of FIG. 6).

Next, outputs P42, P41, P40, and P50 are all put in the high state (time T1 of FIG. 6 again) until the voltage present at P03 passes the VIH threshold, after which P42, P41, and P50 are all placed in the low state until the voltage present at p03 passes the VIL threshold (time T2 of FIG. 6).

Figure 6:
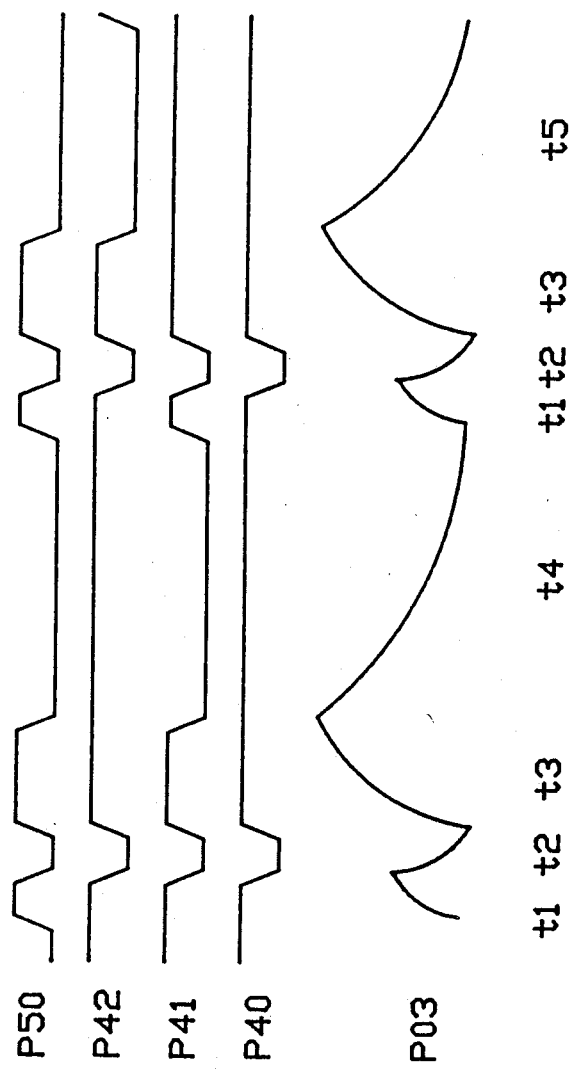
FIG. 6 is a timing diagram illustrating the events taking place while a microprocessor within the Doppler Effect speedometer calculates the air temperature.

After that happens, outputs P42, P41, P40, and P50 are all put in the high state for a fixed time, again of about 5 ms (time T3 of FIG. 6). This charges up capacitor C4 to a fixed value. Then, capacitor C4 is permitted to discharge through thermistor 38. This is done by forcing outputs P50 and P42 into a low state, and forcing outputs P40 and P41 to a high state. The number of CPU cycles it takes until the voltage present at input P03 reaches the VIL threshold is counted. This value is then stored in a register within microprocessor 30. Therefore, stored within microprocessor 30 are the number of CPU cycles it took to discharge a known amount of charge from capacitor C4 through calibration resistor 86 and the number of CPU cycles it took to discharge the same known amount of charge through thermistor 38. Microprocessor 30 calculates the ratio of these two values which is proportional to the ratio of the resistance of thermistor 38 to the resistance of calibration resistor 86. This ratio is function of the temperature, and microprocessor 30 uses that ratio in its calculation of velocity.

Microprocessor 30 uses a similar technique to find the ratio between the discharge time of capacitor C4 through potentiometer 87 and calibration resistor 86. Microprocessor 30 uses this information to determine how often it reports speed data to the user.

Referring to FIG. 4, it is seen that speedometer 10 includes a start button S1, which is capacitively coupled to the RESET input of microprocessor 30, a report button S2 which is coupled to a bi-directional port P52 of microprocessor 30, a stop/restart button S3 which is coupled to a bi-directional port P51 of microprocessor 30, and a pace/speed switch S4 which is resistively coupled to input P51 and output P41 of microprocessor 30. The functions of these switches are as follows:

Start switch S1: Sets distance, time, and averages to zero and starts the user's run, race, etc.

Report Button S2: Causes speedometer 10 to provide distance, time, and average speed data.

Stop/Restart switch S3: Stops speedometer 10, allowing the user to take a break or stop at a stoplight. This suspends speed and time measurements without changing performance data. When the user is ready to start running or riding again, he actuates this button a second time.

Speed/pace switch S4: Causes performance to be given in miles per hour or minutes per mile, depending upon the position of switch S3

Switches S2, S3, and a diode D10 Are coupled to an interrupt input port INT0 of microprocessor 30. Switches S2 and S3 are coupled to bi-directional ports P51 and P52. During operation, ports P51 and P52 are operated as output ports in the high state, and switches S2 and S3 operate as open circuits. Therefore, because a resistor 93 resistively couples port INT0 to ground, port INT0 is normally in the low state. However, when switch S2 or S3 is closed, port INT0 is put in the high state. The presence of a high voltage at port INT0 causes microprocessor 30 to jump to a routine in which it determines the source of the interrupt. It does this by sequentially putting output ports P51, P52, and an output port P53 in the low state. If switch S3 is closed (i.e. jogger 2 is pressing the stop button), when port P51 goes low, the signal present at INT0 also goes low, and microprocessor 30 thus determines that switch S3 is closed. However, if switch S3 is not closed, then changing the state on port P51 has no effect on port INT0, so microprocessor 30 can determine that closure of switch S3 was not the cause of the interrupt.

Microprocessor 30 then drives output port P52 into the low state. If INT0 falls into the low state, then jogger 2 must have closed switch S2 (the report switch). Microprocessor 30 then responds appropriately. If the voltage present at INT0 does not fall into the low state, that means that switch S2 is not closed.

The Pulse-Meter

As described above, diode D10 is also coupled to port INT0. The preferred embodiment of the invention has an input terminal 92 resistively coupled to diode D10. Input terminal 92 is adapted for receiving an electrical signal indicative of the pulse rate of the jogger 2 (FIG. 1). Use of input terminal 92 is optional. When in use, jogger 2 affixes any of several well-known transducers adapted to provide a digital electronic signal in response to a heart pulse to himself and to terminal 92. More specifically, the transducer produces a positive electrical pulse in response to each heart pulse. When a positive voltage pulse is provided by the transducer, the voltage present at port INT0 is pulled high. When microprocessor 30 enters the routine that determines the cause of the interrupt, after checking to see if switch S2 and S3 are closed, output port P53 is pulled into the low state. When this happens, the voltage present at port INT0 is also pulled low. If that happens, then microprocessor 30 determines that the transducer is the cause of the interrupt. Microprocessor 30 jumps to a routine that keeps track of how many heartbeat pulses occur per unit time, and every four seconds, it causes a report on the pulse rate of jogger 2 (FIG. 1).

If jogger 2 no longer desires reports on his pulse rate, he merely decouples the transducer from terminal 92. Since terminal 92 is resistively coupled to ground via a resistor 94, it cannot cause an interrupt signal at port INT0. Microprocessor 30 responds to the absence of pulses by not reporting a pulse rate.

The Second Embodiment of the Invention

Figure 7:
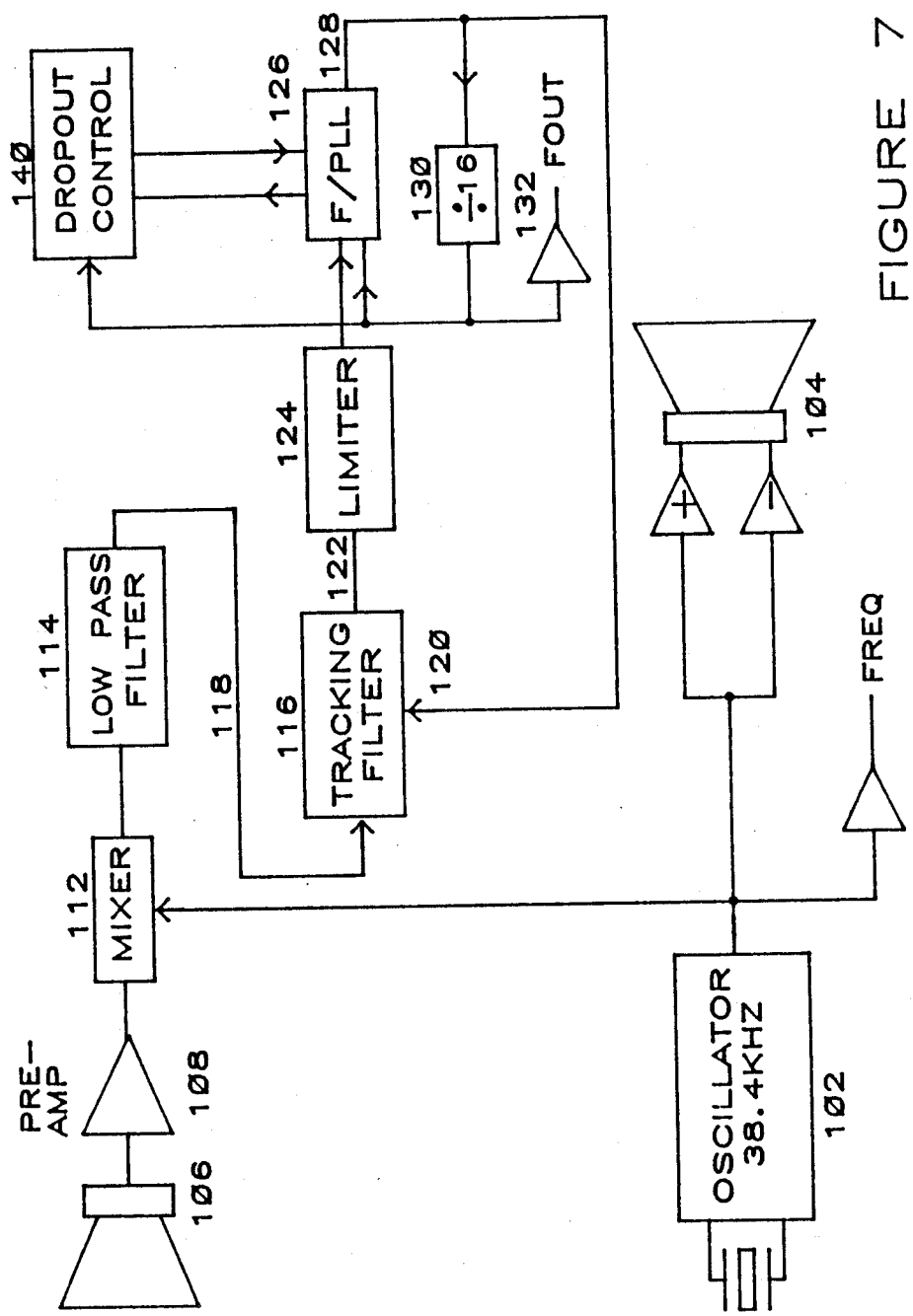
FIG. 7 is a block diagram of a second embodiment of the invention.

Referring to FIG. 7, a block diagram of a second embodiment of the invention is provided. In this second embodiment, the speedometer includes an oscillator 102 which drives a transmitter 104 at a frequency of 38.4 KHz. Transmitter 104 provides a sonic signal at that frequency, and a reflection of that signal is received at a receiver 106, which is amplified by a pre-amplifier 108.

The output of pre-amplifier 108 is presented to a mixer 112 which multiplies the output of amplifier 108 times a square wave signal having a frequency of 38.4 KHz. The resulting signal is passed through a low-pass filter 114, which serves the same function as filter 22 in the first embodiment, and through a tracking filter 116.

Tracking filter 116 has a signal input 118, a clock input 120, and an output 122. Tracking filter 116 acts as a band pass filter, filtering the signal presented on signal input 118. The center frequency of the band pass filter is determined by the frequency of the signal presented at clock input 120. More specifically, the center frequency of the band pass filter is equal to the frequency present at clock input 120 divided by sixteen. The purpose of tracking filter 116 is to render the speedometer more insensitive to noise.

Output 122 is presented to a limiter/threshold detector circuit 124 having the same function as limiter/threshold detector 24 in the previous embodiment. The output of limiter/threshold detector 124 is presented to a phase-locked loop circuit 126. A voltage controlled oscillator output 128 from phase-locked loop circuit 126 is presented to a divide-by-sixteen circuit 130 and clock input 120 to the tracking filter. Thus, the frequency of oscillator output 128 defines the center frequency of tracking filter 116.

The comparator within phase-locked loop circuit 126 compares the frequency of the signal generated by divide-by-sixteen circuit 130 and frequency of the signal generated by limiter/threshold detector 124. Therefore, the oscillator output 128 of phase-locked loop circuit 126 provides a signal that oscillates at sixteen times the frequency of the output of limiter/threshold detector 124.

Also provided is a dropout circuit 140 coupled to phase-locked loop circuit 126. Dropout circuit 140 is provided to maintain the frequency provided at oscillator output 128 if the output of limiter/threshold detector 124 temporarily stops. If that happens, dropout circuit 140 causes the voltage-controlled oscillator within phase-locked loop circuit 126 to remain constant until the output of limiter/threshold detector 124 returns.

Figure 8:
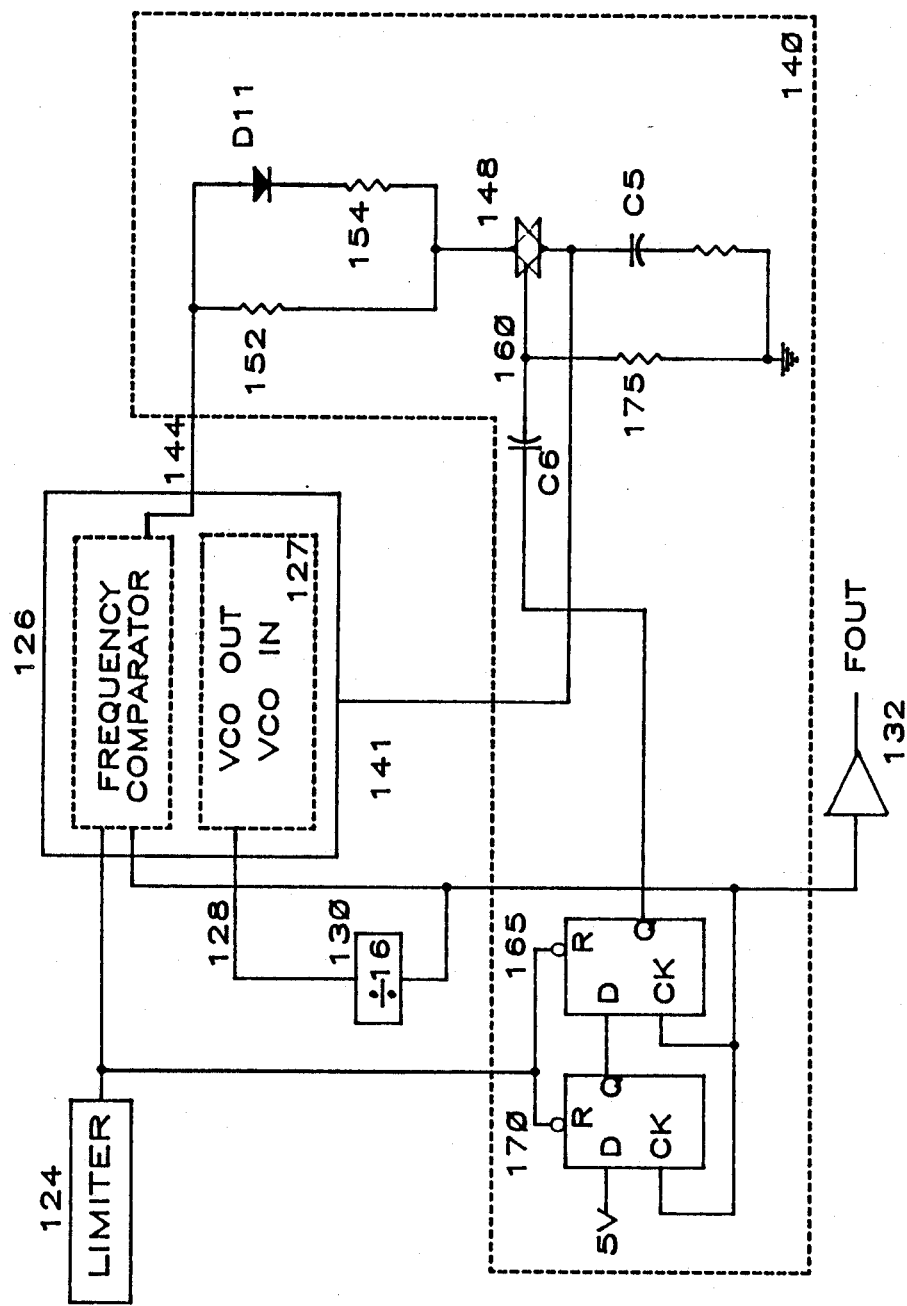
FIG. 8 is a circuit diagram of a dropout circuit and a phase-locked loop within the circuit of FIG. 7.

FIG. 8 is a circuit diagram of dropout circuit 140 connected to phase-locked loop circuit 126. Phase-locked loop circuit 126 includes a voltage-controlled oscillator 127 having an input 141 coupled to a capacitor C5. The voltage across capacitor C5 determines the frequency of the signal present on an oscillator output 128.

Also present within phase-locked loop circuit 126 is a frequency comparator output 144 which is resistively coupled to a switch 148 via the parallel combination of a resistor 152 and a resistor 154 in series with a diode D11. Output 144 either increases or decreases the charge on capacitor C5 when switch 148 is closed. However, when switch 148 is open, capacitor C5 is isolated from output 144, and the voltage across capacitor C5 remains constant, with the result that the oscillation frequency of the signal on output 128 remains constant.

Switch 148 is open when the voltage present at a node 160 is high, and closed when the voltage present at node 160 is low. Node 160 is coupled to the Q output of a flip-flop 165, the D input of which is coupled to the Q output of a flip-flop 170. The reset inputs of flip-flops 165 and 170 are coupled to limiter/threshold detector 124. The clock inputs of flip-flops 165 and 170 are coupled to the outputs of divide-by-sixteen circuit 130.

Flip-flops 165 and 170 are configured to act as a 2-bit counter. Each pulse generated by divide-by-sixteen circuit 130 increments the counter, and each pulse from limiter/threshold detector 124 resets the counter. If limiter/threshold detector 124 stops sending pulses, flip-flops 165 and 170 continue to count. When they reach a count of two (i.e. the Q output of flip-flop 165 goes high), node 160 goes high, causing switch 148 to open. This in turn decouples output 144 from capacitor C5. Therefore, the voltage across C5 remains constant, the voltage presented to voltage-controlled oscillator input 141 remains constant, and the frequency of the signal on oscillator output 128 of phase-locked loop circuit 126 remains constant. Thus, if the signal generated by limiter/threshold detector 124 temporarily fades, phase-locked loop circuit 126 maintains a constant output frequency.

The Q output of flip-flop 165 is coupled to node 160 via a capacitor C6. In addition, node 160 is coupled to ground via a resistor 175. Therefore, when flip-flop 165 drives node 160 high, eventually, even if the Q output of flip-flop 165 remains high, the voltage present at node 160 will decay with a time constant of 350 ms. Thus, even if the limiter/threshold detector circuit 124 stops sending pulses to reset flip-flops 165 and 170, eventually, switch 148 will close, permitting capacitor C5 to discharge. In that way, dropout circuit 140 differentiates between a transient disappearance of a signal from limiter/threshold detector 124 and a permanent disappearance of the signal (caused, for example, when jogger 2 stops.

The output of divide-by-sixteen circuit 130 drives a buffer 132 (FIG. 7), which is adapted to drive a microprocessor such as one in the previous embodiment.

While the invention has been particularly taught and described with reference to the preferred embodiments, those versed in the art will appreciate that minor modifications in form and detail may be made without departing from the spirit and scope of the invention. For instance, the invention could use a different model microprocessor or speech chip. In addition, the oscillator could provide signals of different reference frequencies. Further, instead of using frequency shifting in sonic signals, electromagnetic waves could be used. For example, electromagnetic microwaves would be suitable for use. Accordingly, all such modifications are embodied within the scope of this patent as properly come within my contribution to the art and are particularly pointed out by the following claims.

I claim:

1. A reflecting Doppler effect speedometer comprising:
   means for transmitting a first signal having a first frequency;
   means for receiving a second signal having a second frequency, the second signal being a reflection of the first signal;
   mixing means for generating a third signal having a frequency responsive to the difference between the frequencies of the first and second signals;
   circuit means coupled to receive the third signal for providing a binary signal on a circuit means output, the circuit means output being adapted to change state from a high state to a low state when the voltage on the filter output drops below a first threshold value, the circuit means output being adapted to change state from a low state to a high state when the voltage on the filter output rises above a second threshold value, the second threshold value being greater than the first threshold value;

means for varying one of the threshold values in response to the peak value of the third signal; and calculating means for calculating velocity in response to the frequency of the signal present on the circuit means output.

2. A speedometer as in claim 1 wherein the means for varying one of the threshold values comprises:
first means for determining the first threshold voltage, the first threshold voltage being determined in response to the negative peak value of the third signal; and the circuit further comprises:
second means for determining the second threshold voltage, the second threshold voltage being determined in response to the positive peak value of the third signal.

3. A speedometer as in claim 1 wherein the means for varying one of the threshold values comprises:
means for determining the first threshold voltage, the first threshold voltage being a predetermined fraction of the peak value of the third signal.

4. A reflecting Doppler Effect speedometer as in claim 1 wherein the circuit means comprises:
a first diode having an anode and a cathode, the anode of the first diode being coupled to receive the third signal;
a second diode having an anode and a cathode, the cathode of the second diode being coupled to receive the third signal;
a first capacitor having a first terminal and a second terminal, the second terminal of the first capacitor being connected to a constant voltage potential, the first terminal being coupled to the cathode of the first diode;
a second capacitor having a first terminal coupled to a constant voltage potential and a second terminal coupled to the anode of the second diode;
a third diode having a cathode coupled to the cathode of the first diode, the third diode also having an anode;
a fourth diode having an anode coupled to the anode of the second diode and a cathode coupled to the anode of the third diode; and
a first operational amplifier having an inverting input coupled to a constant voltage potential, a non-inverting input resistively coupled to receive the third signal, and an output resistively coupled to the non-inverting input and resistively coupled to the anode of the third diode, the output of the operational amplifier being coupled to the circuit means output.

5. A method for calculating the velocity of a speed measuring device comprising the steps of:
charging a capacitor to a predetermined voltage;
determining the amount of time it takes the capacitor to discharge through a first resistor of known resistance;
changing the capacitor to a predetermined voltage;
determining the amount of time it takes for the capacitor to discharge through a second resistor having a resistance dependent on temperature;
calculating the ratio of the discharge time through the first resistor to the discharge time through the second resistor;
setting a time period in response to the calculated ratio;
providing a doppler signal having a frequency dependant on the velocity of the speed measuring device and the ambient temperature;
counting the number of cycles of the doppler signal occurring in the time period; and
calculating the velocity of the speed measuring device in response to the number of counted cycles.

6. A reflecting Doppler effect speedometer comprising:
means for transmitting a first signal having a frequency;
means for receiving a second signal the second signal being a reflection of the first signal, the second signal having a second frequency;
mixing means for generating a third signal having a frequency responsive to the difference between the frequencies of the first and second signals;
a voltage controlled oscillator having an input terminal, the voltage controlled oscillator being adapted to provide a signal on an oscillator output terminal, the signal on the oscillator output terminal having a frequency responsive to the voltage present at the input terminal;
frequency comparator means having a first input, a second input and an output the first input coupled to receive the third signal, the second input coupled to the oscillator output terminal, the output providing a fourth signal having a first voltage if the frequency of the signal on the first input is greater than the frequency of the signal on the second input, the fourth signal having a second voltage if the frequency of the signal on the first input is less than the frequency of the signal on the second input;
calculation means for calculating velocity of the speedometer, the calculation means being coupled to the oscillator output terminal, the calculation means calculating speed in response to a signal present on the oscillator output terminal;
a capacitor adapted to store charge, one terminal of the capacitor being coupled to the input terminal of the voltage controlled oscillator, voltage present at the input terminal being determined by the change stored on the capacitor; and
resistance means for charging and discharging the capacitor at different rates, the resistance means comprising a first resistor coupled between the output of the frequency comparator means and the one terminal of the capacitor and further comprising a second resistor coupled in series with a diode, the series coupled second resistor and diode coupled in parallel with the first resistor.

7. Apparatus for measuring velocity comprising:
a signal source for providing a first signal:
a receiver for receiving a reflection of the first signal:
signal means for providing a second signal having a frequency indicative of the difference in frequency between the first signal and the reflection of the first signal, the signal means providing the second signal on a signal output:
temperature means for calculating temperature:
a microprocessor having a signal input coupled to the signal output, the microprocessor also being coupled to the signal output, the microprocessor also being coupled to the temperature means, the microprocessor being adapted to count the number of cycles of the second signal during a predetermined time period, the microprocessor altering the duration of the predetermined time period in response to the temperature, the microprocessor calculating the velocity of the apparatus in response to the number of counted cycles:

wherein the temperature means for calculating temperature comprises: a capacitor for storing change, the capacitor having a first terminal coupled to a constant voltage source and a second terminal coupled to a sensing input of the microprocessor; a first resistor coupled to the second terminal of the capacitor and a first output of the microprocessor; a temperature-sensitive resistor coupled to the second terminal of the capacitor and a second output of the microprocessor, the microprocessor being adapted to charge the capacitor, permit the capacitor to discharge through the first resistor, the microprocessor sensing the voltage present on the second terminal of the capacitor, the microprocessor counting the number of machine cycles between the time the capacitor starts to discharge through the first resistor and the time the voltage present at the second terminal of the capacitor reaches a predetermined threshold, the microprocessor being adapted to charge the capacitor again and permit the capacitor to discharge through the second resistor, the microprocessor being adapted to count the number of machine cycles between the time the capacitor starts to discharge through the second resistor and the time the voltage present at the second terminal of the capacitor reaches the predetermined threshold.

8. A reflecting Doppler effect speedometer comprising:

means for transmitting a first signal having a first frequency;

means for receiving a second signal, the second signal being a reflection of the signal, the second signal having a second frequency;

mixing means for generating a third signal having a frequency responsive to the difference between the frequencies of the first and second signals;

a variable oscillator adapted to receive an input signal, the variable oscillator providing an oscillator output signal having a frequency response to the input signal;

frequency comparator means coupled to receive the third signal and oscillator output signal for providing a fourth signal having a first value if the frequency of third signal is greater than the frequency of the oscillator output signal, the fourth signal having a second value if the frequency of the third signal is less than the frequency of the oscillator output signal;

calculation means for calculating velocity of the speedometer, the calculation means being coupled to receive the oscillator output signal, the calculation means calculating speed in response to the value of the oscillator output signal;

accumulator means for providing an input signal to the variable oscillator in response to the fourth signal, the accumulator means adapted to increase the value of the input signal at a first rate in response to the fourth signal having a first value and to decrease the value of the input signal at a rate different from the first rate in response to the fourth signal having a second value.

9. Apparatus for measuring velocity comprising:

a signal source for providing a first signal;

a receiver for receiving a reflection of the first signal;

signal means for providing a second signal having a frequency responsive to the frequency of first signal and the frequency of the reflection of the first signal;

temperature means comprising: (a) a capacitor for storing charge, the capacitor having a first terminal coupled to a constant voltage source and a second terminal; (b) a first resistor having a first terminal coupled to the second terminal of the capacitor and having a second terminal; and (c) a temperature-sensitive resistor having a first terminal coupled to the second terminal of the capacitor and having a second terminal;

control means for charging the capacitor, discharging the capacitor through the first resistor, sensing the voltage present on the second terminal of the capacitor, determining a first discharge time for the capacitor to discharge through the first resistor until the voltage present at the second terminal of the capacitor reaches a predetermined threshold, charging the capacitor again, discharging the capacitor through the temperature-sensitive resistor, sensing the voltage present on the second terminal of the capacitor, determining a second discharge time for the capacitor to discharge through the temperature-sensitive resistor until the voltage present at the second terminal of the capacitor reaches the predetermined threshold; and calculating means having a signal input coupled to receive the second signal, and coupled to the control means, for calculating the velocity of the apparatus in response to the number of cycles of the second signal during a time period, the time period being varied to compensate for temperature in response to the values of the first and second discharge times.

* * * * *